(12) United States Patent
Jansen Van Doorn et al.

(10) Patent No.: US 6,477,294 B1
(45) Date of Patent: Nov. 5, 2002

(54) OPTICAL DEVICE HAVING SECOND ARRAYED WAVEGUIDE GRATING FOR TEMPERATURE CONTROL

(75) Inventors: Arnold Karel Jansen Van Doorn; Antonius Adriaan Maria Staring, both of Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 51 days.

(21) Appl. No.: 09/671,913

(22) Filed: Sep. 28, 2000

(30) Foreign Application Priority Data

Sep. 29, 1999 (EP) ................................. 99203178
Feb. 28, 2000 (EP) ................................. 00200680

(51) Int. Cl.[7] ................................................. G02B 6/28
(52) U.S. Cl. ............................. 385/24; 385/14; 385/37
(58) Field of Search ............................... 385/24, 37, 46, 385/50, 14; 359/124, 127, 130

(56) References Cited

FOREIGN PATENT DOCUMENTS

| EP | 0591042 A1 | 4/1994 | ............ G02B/6/34 |
|----|------------|--------|------------------------|
| EP | 0703679 A2 | 3/1996 | ............ H04B/10/14 |

*Primary Examiner*—Hung Xuan Dang
(74) *Attorney, Agent, or Firm*—Michael E. Belk

(57) ABSTRACT

An optical device for multiplexing/demultiplexing optical wavelength signals comprises arrayed waveguide grating devices. To one thereof an optical signal, e.g. one of the optical wavelength signals or an optical signal from a reference source, is input so that its corresponding output signal can be used as a temperature control signal for a temperature control means of the waveguide device. Thus optimization for one optical wavelength signal automatically leads to optimization of all other optical wavelength signals.

19 Claims, 3 Drawing Sheets

OPTICAL DEVICE HAVING SECOND ARRAYED WAVEGUIDE GRATING FOR TEMPERATURE CONTROL

BACKGROUND OF THE INVENTION

1. Technical Field

The present invention relates to an optical device for multiplexing/demultiplexing optical wavelength signals, comprising phased array waveguide devices.

The present invention also relates to a phased array waveguide device for application in the optical device.

2. Prior Art

Such an optical device is known from EP-A-0 591 042. The known optical device is a multiplexer/demultiplexer device for one or more optical wavelength signals and is applicable to optical communications systems and optical switching systems. The known optical device is used in particular for splitting and inserting optical wavelength-multiplexed signals. The same optical device in the form of a phased array waveguide grating device is used to perform both multiplexing and demultiplexing operations and so the wavelength characteristics of the multiplexer and demultiplexer are well matched. The provided optical device output signals are narrow band, because the optical signals are passed through the same device several times. In addition splitting losses and noise components of the optical output signals are said to be minimized in the known device. However due to temperature variations and temperature differences of device components, transmission properties of the known optical device, such as distortion and throughput as a function of temperature in the short and long run are poor.

SUMMARY OF THE INVENTION

Therefore it is an object of the present invention to provide an optical device achieving a maximum throughput in a broad frequency range, while maintaining a simple structure.

Thereto the optical device according to the present invention is characterized in that the optical device comprises waveguide device temperature control means having a temperature control input, whereby an optical signal is input to one of the phased array waveguide devices, whose output is coupled to the temperature control input of the temperature control means.

It is an advantage of the optical device according to the invention that one of the arrayed waveguide gratings is applied for temperature control purposes only, while the other grating is used as a flat response main filter for each of the input RF signals concerned. In general temperature control of the gratings is vital, because of the relative strong dependency of the transmission properties on the actual temperature. Temperature control has improved because of the fact that if the transmission of the optical signal, which is input to the one separate arrayed waveguide grating concerned is stabilized relative to the temperature of said grating, the wavelength signals and their transmission through the other grating are automatically stabilized and maximized/centralized as well. A further advantage is that this second grating used for temperature stabilization purposes does not interfere with the first grating or with a proper functioning thereof. The optical signal may be one of the optical wavelength signals or be generated by a reference source, e.g. a reference laser.

Preferably an embodiment of the optical device of the invention is characterized in that the phased array waveguide devices comprise arrayed waveguide gratings coupled between waveguide structures and sharing one substrate. At least seen from the manufacturing side this does not add substantial complexity to the manufacturing thereof.

Another embodiment of the optical device according to the invention is characterized in that the each of the arrayed waveguide gratings comprises waveguides, whereby the number of waveguides of the arrayed waveguide grating for temperature control exceeds the number of waveguides of the other arrayed waveguide grating. Because of the larger number of waveguides in the arrayed waveguide grating for temperature control advantageously the wavelength resolution thereof is larger than that of the other arrayed waveguide grating. As a consequence the former grating is better equipped for temperature control, as the amplitude of the optical signal conveyed thereby is a better representation for the actual temperature of the grating.

A still further embodiment of the optical device according to the invention is characterized in that at least a part of input or output optical waveguide signals is applied to the phased array waveguide device for temperature control. It is an advantage that this opens the way for implementing various practical embodiments of the optical device according to the invention.

In possible different implementations the optical device is further characterized in that the optical device functions as a multiplexer or a demultiplexer.

Similarly the phased array waveguide device for application in the optical device is characterized in that it comprises waveguide structures having separate arrayed waveguide gratings coupled there between.

BRIEF DESCRIPTION OF THE DRAWINGS

At present the optical device and phased array waveguide device according to the invention will be elucidated further together with its additional advantages, while reference is being made to the appended drawing, wherein similar components are being referred to by means of the same reference numerals. In the drawing.

DETAILED DESCRIPTION OF THE INVENTION

Figure 1:
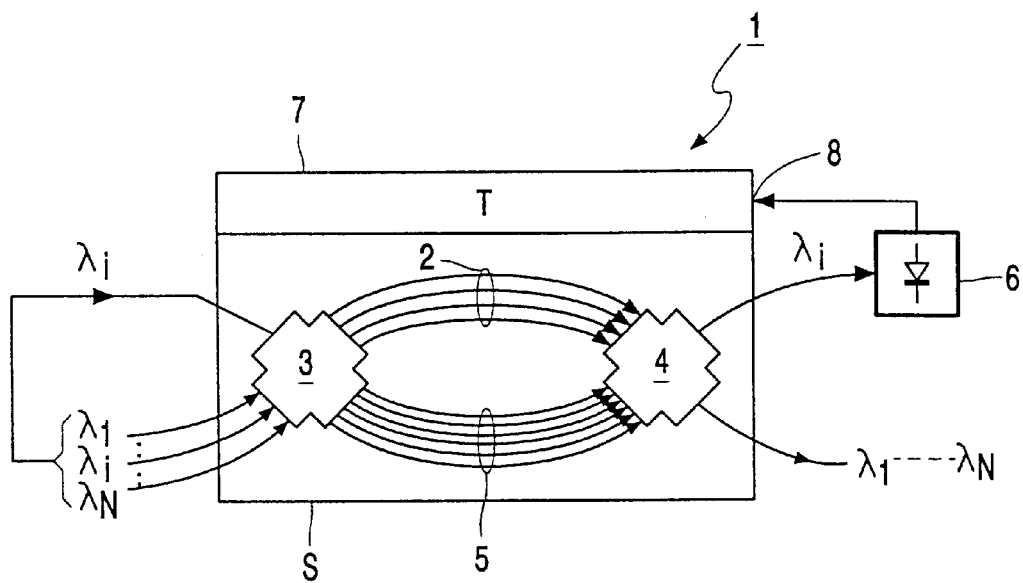
FIGS. 1–3, 5 and 6 show various possible embodiments of the optical device according to the present invention.

FIGS. 1–3, 5 and 6 show an optical device 1 for application in optical communication and switching systems. The optical device 1 is a multiplexer which generally has a main filter characteristic as shown in dotted lines as a fiction of the temperature of its components in FIG. 4. It shows that the transmission Tr is dependent on the said temperature. The embodiment of the optical device 1 of FIG. 1 shows an optical main path having a phased array waveguide device in the form of an arrayed waveguide grating 2 coupled between waveguide structures 3 and 4. Multiple optical signals $\lambda_1 \ldots \lambda_i \ldots \lambda_N$ are input to waveguide structure 3 and passed through a number k of waveguides of the grating 2. These waveguides have mutually different path lengths between mutually different paths seen from input(s) to output(s). An optimum throughput for the output concerned will only be reached for the wavelength wherefore the signals from the waveguide paths are precisely in phase at the output. The other wavelength are cancelled out. Thus the principle operation is the same as the operation of for example a FIR or IIR filter. Waveguide structure 4 gathers the optical signals through grating 2 and provides optical output signals $\lambda_1 \ldots \lambda_i \ldots \lambda_N$. In the embodiments as shown a second phased array waveguide device in the form of an arrayed waveguide grating 5 is coupled transversely between the waveguide structures 3 and 4. In FIG. 1 one of the optical wavelength signals $\lambda_i$, where i=1 . . . N is input at the structure 3, is splitted thereby and propagated through a number 1 of waveguides of the arrayed waveguide grating 5. Structure 4 gathers the optical signals in this additional path and demultiplexes them to reveal the signal $\lambda_i$ again. The filter characteristic of the additional path is shown in FIG. 4 in a drawn line. The drawn line characteristic is such that an accurate and selective temperature error signal can be derived by the measuring means 6. The amplitude or output power of the output signal in the additional path is determined by a measuring means 6. Preferably both waveguide structures 3 and 4 share one substrate, indicated with S, so that advantageously the one substrate S can be kept on a constant temperature by a temperature control means 7, indicated with T. The temperature control means 7 have a temperature control input 8, which is coupled to the measuring means 6 in order to control the substrate temperature in dependence on the amplitude of the optical signal $\lambda_i$. The temperature can be controlled such that the measured amplitude of the signal $D_i$ is maximized, in which case the transmission Tr for all optical output signals $\lambda_1 \ldots \lambda_N$ is optimized. The accuracy of the temperature control by means of the additional temperature control path can be improved by allowing the number of waveguides 1 of the arrayed waveguide grating 5 to be larger than the number of waveguides k of the arrayed waveguide grating 3. In that case the greater number of curved waveguides 1 provide an improved waveguide resolution, such that an increased accurate temperature control can be achieved.

Figure 2:
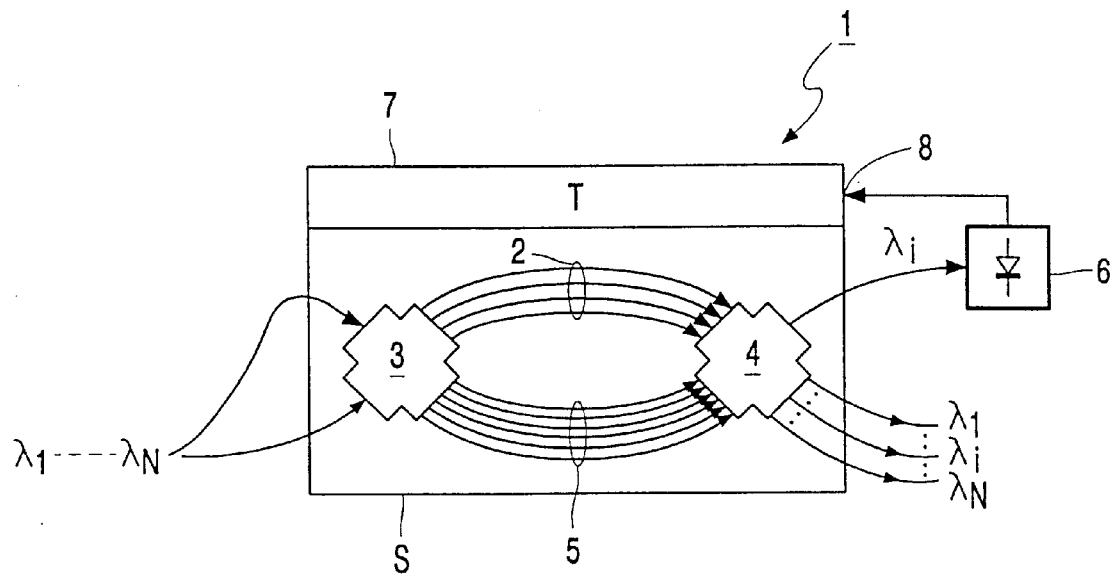
Figure 3:
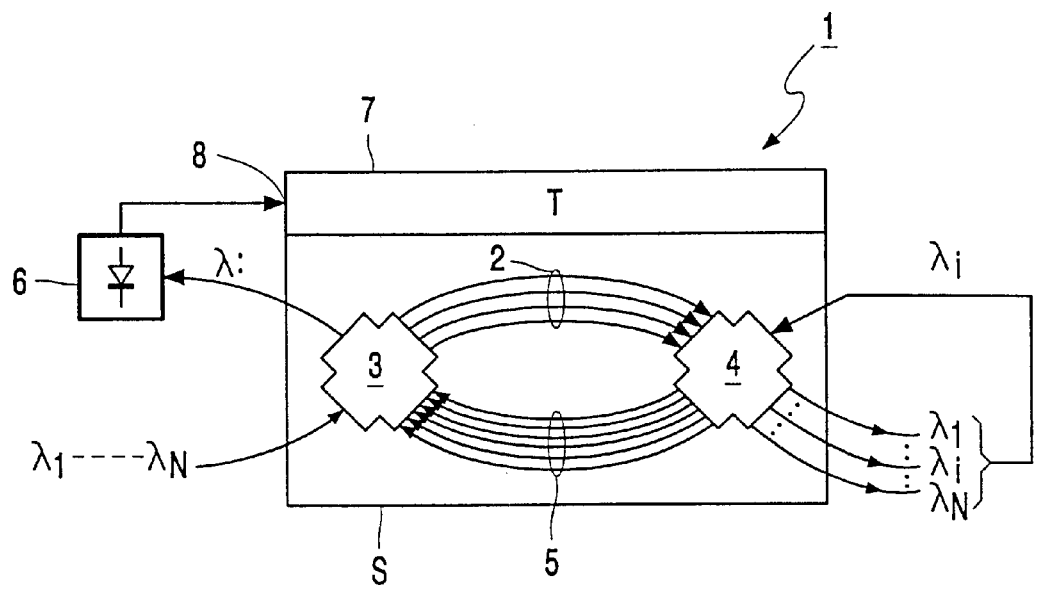
Figure 4:
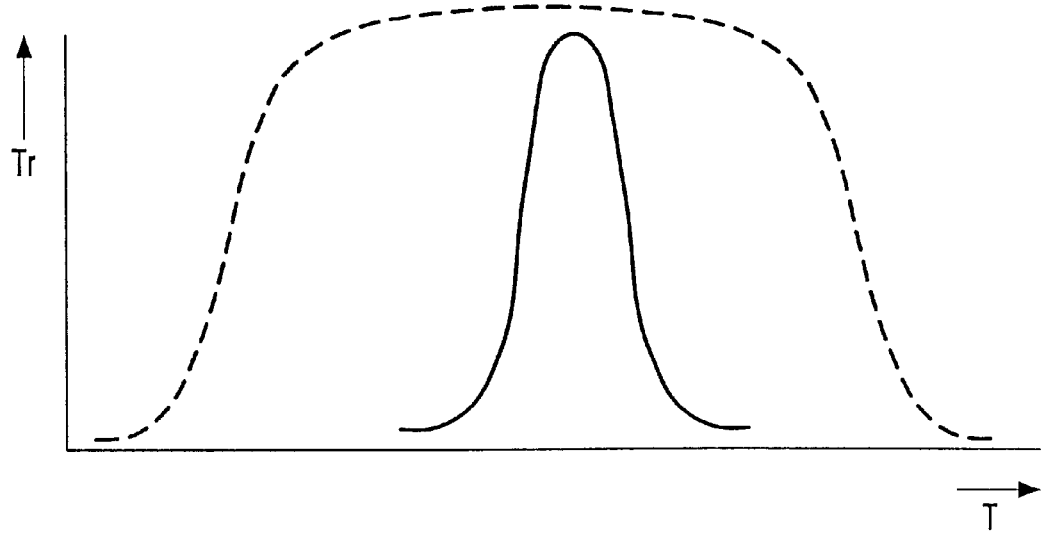
FIG. 4 shows a graph of the transmission versus temperature behavior of optical main and temperature control paths in the embodiments of FIGS. 1—3 for one of the wavelengths to be multiplexed.

The embodiments of FIGS. 2 and 3 demultiplex the one optical input signal $\lambda_1 \ldots \lambda_i \ldots \lambda_N$. The same input signal is fed to the additional temperature control path and finally the amplitude of one of the signals $\lambda_i$ is again measured by the measuring means 6 for temperature control purposes. The aforementioned input signal may at wish be splitted inside or outside the optical device 1.

In the demultiplexer of FIG. 3 one of the output signals $\lambda_i$ is fed back in reverse direction through the optical waveguide structures 3 and 4 and one the output signals in the now reverse temperature control path is measured and used for temperature control in the optical device 1.

Figure 5:
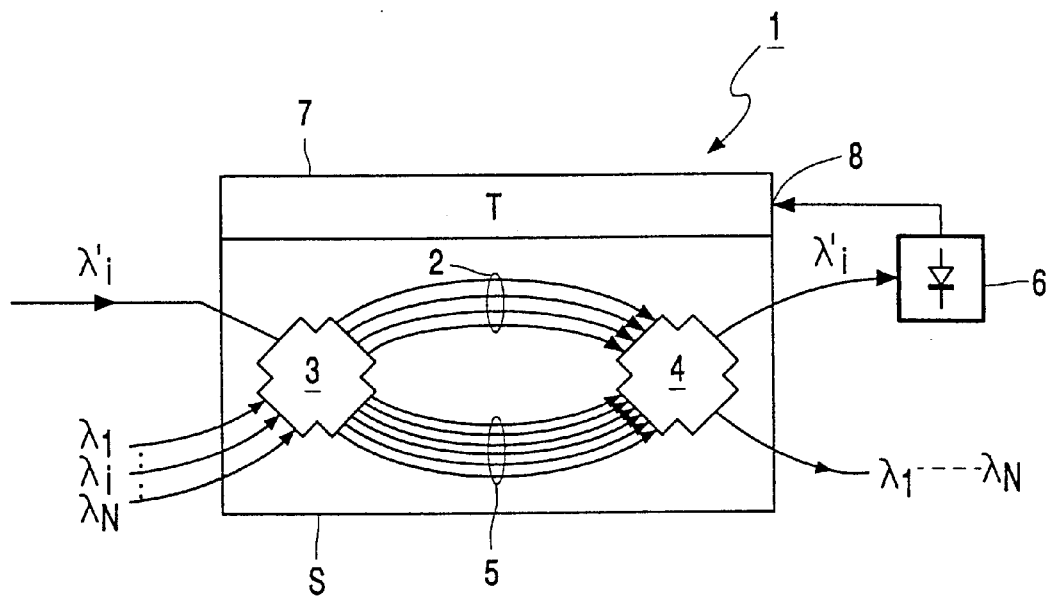

FIG. 5 shows a multiplexer similar to the one shown in FIG. 1. However, in stead of one of the optical wavelength signals $\lambda_i$, a signal $\lambda'_i$ from a reference source, e.g. a reference laser, is used for temperature control purposes.

Figure 6:
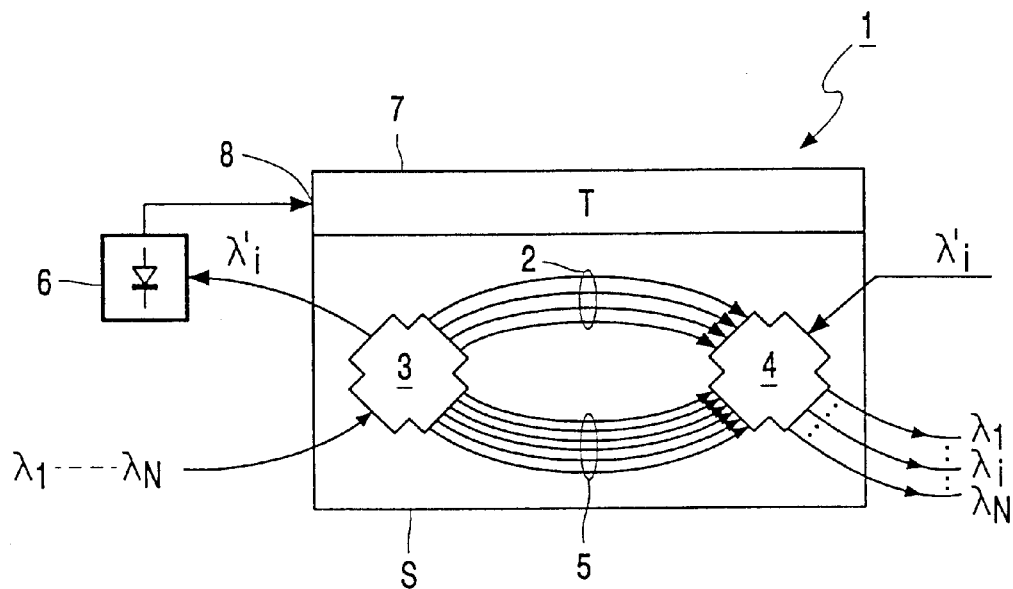

FIG. 6 shows a demultiplexer similar to the one shown in FIG. 3. However, in stead of one of the optical wavelength signals $\lambda_i$, a signal $\lambda'_i$ from a reference source, e.g. a reference laser, is used for temperature control purposes.

What is claimed is:

1. An optical device for multiplexing/demultiplexing optical wavelength signals, comprising phased array waveguide devices, characterized in that the optical device comprises waveguide device temperature control means having a temperature control input, whereby an optical signal is input to one of the phased array waveguide devices, whose output is coupled to the temperature control input of the temperature control means.

2. The optical device according to claim 1, characterized in that the optical signal is one of the optical wavelength signals.

3. The optical device according to claim 1, characterized in that the optical signal is generated by a reference source.

4. The optical device according to claim 1, characterized in that the phased array waveguide devices comprise arrayed waveguide gratings coupled between waveguide structures and sharing one substrate.

5. The optical device according to claim 4, characterized in that the each of the arrayed waveguide gratings comprises waveguides, whereby the number of waveguides of the arrayed waveguide grating for temperature control exceeds the number of waveguides of the other arrayed waveguide grating.

6. The optical device according to claim 1, characterized in that at least a part of input or output optical wavelength signals is applied to the phased array waveguide device for temperature control.

7. The optical device according to claim 1, characterized in that the optical device functions as a multiplexer or a demultiplexer.

8. Phased array waveguide device for application in the optical device according to claim 1, characterized in that the phased array waveguide device comprises waveguide structures having separate arrayed waveguide gratings coupled there between.

9. An optical device, comprising:

a substrate;

a first waveguide structure coupled to the substrate;

a second waveguide structure coupled to the substrate;

a first phased array waveguide device coupled to the first and second waveguide structures and disposed between the first and second waveguide structures, a second phased array waveguide device coupled to the first and second waveguide structures and disposed between the first and second waveguide structures, wherein the second phased array waveguide device is adapted to have an optical signal pass through the second phased array waveguide device, and wherein a temperature of the substrate is controllable in dependence on an amplitude of the optical signal.

10. The optical device of claim 9, wherein the first phased array waveguide device comprises an arrayed waveguide grating having K waveguides, wherein the second phased array waveguide device comprises an arrayed waveguide grating having L waveguides, and wherein L is greater than K.

11. The optical device of claim 9, wherein the first phased array waveguide device comprises an arrayed waveguide grating having waveguides, wherein the second phased array waveguide device comprises an arrayed waveguide grating having waveguides, and wherein a wavelength resolution of the arrayed waveguide grating of the second phased array waveguide device exceeds a wavelength resolution of the arrayed waveguide grating of the first phased array waveguide device.

12. The optical device of claim 9, further comprising measuring means for measuring an amplitude or output power of the optical signal.

13. The optical device of claim 12, further comprising temperature control means for controlling the temperature of the substrate, wherein the temperature control means is coupled to the measuring means.

14. The optical device of claim 9, wherein the first array waveguide is adapted to have a plurality of optical signals passing therethrough from the first waveguide structure to the second waveguide structure or from the second waveguide structure to the first waveguide structure.

15. The optical device of claim 14, wherein the plurality of optical signals comprises the optical signal.

16. The optical device of claim 14, wherein the optical signal is adapted to be generated by a reference source and is not comprised by the plurality of optical signals.

17. The optical device of claim 14, wherein a plurality of optical paths disposed between the first waveguide structure and the second waveguide structure have mutually different path lengths.

18. The optical device of claim 14, further comprising measuring means for measuring the amplitude or output power of the optical signal after the optical signal propagates through the second phased array waveguide device from the first waveguide structure to the second waveguide structure.

19. The optical device of claim 14, further comprising measuring means for measuring the amplitude or output power of the optical signal after the optical signal propagates through the second phased array waveguide device from the second waveguide structure to the first waveguide structure.

* * * * *